(12) United States Patent
Hassan et al.

(10) Patent No.: US 8,026,340 B2
(45) Date of Patent: Sep. 27, 2011

(54) HIGH SHEAR OXIDATION OF WAX

(75) Inventors: Abbas Hassan, Sugar Land, TX (US); Harshad M. Bhatt, Borivali (IN); Aziz Hassan, Sugar Land, TX (US); Gregory G. Borsinger, Chatham, NJ (US)

(73) Assignee: H R D Corporation

( * ) Notice: Subject to any disclaimer, the term of this patent is extended or adjusted under 35 U.S.C. 154(b) by 0 days.

(21) Appl. No.: 12/637,423

(22) Filed: Dec. 14, 2009

(65) Prior Publication Data

US 2010/0234550 A1    Sep. 16, 2010

Related U.S. Application Data

(60) Provisional application No. 61/122,929, filed on Dec. 16, 2008, provisional application No. 61/236,967, filed on Aug. 26, 2009.

(51) Int. Cl.
*C08G 64/00* (2006.01)
*C08G 63/02* (2006.01)

(52) U.S. Cl. ......... 528/502; 422/198; 422/224; 526/351

(58) Field of Classification Search .................. 422/198, 422/224; 526/351
See application file for complete search history.

(56) References Cited

U.S. PATENT DOCUMENTS

| | | | |
|---|---|---|---|
| 3,968,035 A * | 7/1976 | Howe | 210/621 |
| 5,530,046 A | 6/1996 | Miyake et al. | |
| 5,877,350 A | 3/1999 | Langer et al. | |
| 5,965,676 A | 10/1999 | Anan et al. | |
| 6,368,366 B1 | 4/2002 | Langer et al. | |
| 6,368,367 B1 | 4/2002 | Langer et al. | |
| 6,383,237 B1 | 5/2002 | Langer et al. | |
| 7,749,481 B2 * | 7/2010 | Hassan et al. | 423/576.4 |
| 2003/0043690 A1 | 3/2003 | Holl | |
| 2004/0052158 A1 | 3/2004 | Holl | |
| 2005/0033069 A1 | 2/2005 | Holl et al. | |
| 2010/0018118 A1 * | 1/2010 | Hassan et al. | 48/127.9 |

FOREIGN PATENT DOCUMENTS

DE    19907737 A1    8/2000

OTHER PUBLICATIONS

Garcia-Morales, M. et al., "Processing, Rheology, and Storage Stability of Recycled EVA/LDPE Modified Bitumen," Polymer Engineering and Science, vol. 47, pp. 181-191, Feb. 2007.
International Application No. PCT/US2009/067907 International Search Report dated Jul. 29, 2010, 6 pages.

* cited by examiner

*Primary Examiner* — Terressa Boykin
(74) *Attorney, Agent, or Firm* — Porter Hedges LLP; Timothy S. Westby

(57) ABSTRACT

In this disclosure, a system is described, comprising a shear device with at least one inlet and at least one outlet and a mixing vessel with at least one inlet and at least one outlet, wherein an inlet of the shear device is in fluid communication with an outlet of the mixing vessel. In certain embodiments, the shear device and the mixing vessel form a loop for fluid communication. Also disclosed herein is a method of high shear oxidation, comprising mixing an oxidant with a substrate to form a substrate-oxidant mixture and applying shear to the substrate-oxidant mixture to form a product. The product includes ethylene oxide, propylene oxide, terephthalic acid, phenol, acrylonitrile, maleic anhydride, phthalic anhydride, nitric acid, caprolactam, oxidized polyethylene, oxidized polypropylene, oxidized polyethylene copolymers, and oxidized polypropylene copolymers. Suitable oxidant includes air, oxygen, ozone, peroxide, organic peroxide, halogen, oxygen-containing gas, and halogen-containing gas.

20 Claims, 7 Drawing Sheets

HIGH SHEAR OXIDATION OF WAX

CROSS-REFERENCE TO RELATED APPLICATIONS

This application claims the benefit under 35 U.S.C. §119(e) of U.S. Provisional Patent Application Nos. 61/122,929 filed Dec. 16, 2008 and 61/236,967 filed Aug. 26, 2009, the disclosures of which are hereby incorporated herein by reference.

STATEMENT REGARDING FEDERALLY SPONSORED RESEARCH OR DEVELOPMENT

Not Applicable.

FIELD OF THE INVENTION

The present invention generally relates to oxidation processes of polymers and waxes. More particularly, the present invention relates to utilizing high shear in oxidizing polymers and waxes.

BACKGROUND

Oxidation is one of the most common categories of reactions, which is utilized in a wide variety of fields—industrial, military, medical, engineering, consumer products, etc. For example, alkenes are oxidized to produce ethylene oxide and propylene oxide. Some other examples include the production of terephthalic acid, phenol, acrylonitrile, maleic anhydride, phthalic anhydride, nitric acid, and caprolactam.

In addition to the oxidation of small molecules, polymers are also oxidized to produce marketable commodities (e.g., oxidized polyethylene waxes) or important intermediates with various functionalized groups for further processing. For example, oxidized polyethylene is useful as components in lubricants for polymer processing and as a water based emulsion in textile, floor care products, leather processing, water dispersible coatings, fruit coatings and inks. Furthermore, oxidation of polymers and waxes is able to modify the properties of polymers and waxes, such as molecular weight distribution, viscosity, density, drop point. A possible mechanism is by cleaving long polymeric molecules to produce shorter polymeric chains.

Therefore, there is continuing interest in developing new oxidation processes that are efficient and economical.

SUMMARY

In this disclosure, a system is described. The system comprises a shear device with at least one inlet and at least one outlet; a substrate pipe with at least one inlet fluidly connected to a substrate source, and at least one outlet; an oxidant pipe with at least one inlet fluidly connected to an oxidant source, and at least one outlet; and a steam pipe with at least one inlet fluidly connected to a steam source, and at least one outlet; wherein the at least one outlet of the substrate pipe, at least one outlet of the oxidant pipe, and at least one outlet of the steam pipe are fluidly connected to the inlet of the shear device. In an embodiment, the system further comprises at least one pump to control the flow rate and residence time of fluids passing through the shear device.

In an embodiment, the system further comprises a flash system fluidly connected to the outlet of the shear device. In another embodiment, the system further comprises at least one heat exchanger to control the temperature of the substrate. In yet a further embodiment, the system further comprises a gas injection system to control the flow rate of the oxidant in the oxidant pipe. In another embodiment, the system further comprises a steam injection system to control the flow rate of steam in the steam pipe.

In an embodiment, the system further comprises at least one storage vessel fluidly connected to the outlet of the shear device. In some cases, such a system comprises a temperature and pressure control system to regulate the temperature and pressure of the storage vessel. In a further embodiment, the outlet of the shear device is fluidly connected to the substrate source, forming a recycle loop.

Another disclosed system comprises a shear device with at least one inlet and at least one outlet; a substrate pipe with at least one inlet fluidly connected to a substrate source, and at least one outlet; a steam pipe with at least one inlet fluidly connected to a steam source, and at least one outlet; wherein the at least one outlet of the substrate pipe and at least one outlet of the steam pipe are fluidly connected to the inlet of the shear device. A further system comprises a substrate pipe with at least one inlet fluidly connected to a substrate source, and at least one outlet; a melter with at least one inlet fluidly connected to the substrate pipe outlet and at least one outlet; and a shear device with at least one inlet fluidly connected to the melter outlet and at least one outlet.

In this disclosure, a method is presented. The method comprises providing a substrate, wherein the substrate comprises a polymer or a wax; providing an oxidant; providing steam; mixing the substrate, the oxidant and steam to form a mixture; and applying shear to the mixture to form a product. In an embodiment, in such a method, mixing the substrate, the oxidant and steam and applying shear take place simultaneously in a shear device. In another embodiment, the method further comprises recycling at least a portion of the product to be subjected to additional shear.

In some cases, the substrate comprises high viscosity crude oil, polyethylene or polyethylene wax. In some cases, the oxidant is selected from the group consisting of air, oxygen, ozone, peroxide, organic peroxide, halogen, oxygen-containing gas, and halogen-containing gas. In an embodiment, the flow rate or residence time of the mixture subjected to shear is controlled. In an embodiment, the flow rate of oxidant is controlled. In an embodiment, the flow rate of steam is controlled. In a further embodiment, the ratio of substrate to oxidant, or the ratio of substrate to steam, or both ratios are controlled. In another embodiment, the shear rate applied to the mixture is controlled.

In an embodiment, applying shear to the mixture accomplishes at least one of the following effects: to reduce the viscosity of the substrate; to modify the density of the substrate; to change the drop point of the substrate; and to decrease the average molecular weight of the substrate. In another embodiment, applying shear to the mixture is carried out in coordination with temperature and pressure control. In some embodiments, applying shear to the mixture is carried out continuously, semi-continuously, or batch-wise. In a further embodiment, the method comprises storing the product at elevated temperature and pressure.

Another disclosed method comprises providing a substrate, wherein the substrate comprises a polymer or a wax; applying heat to the substrate; and applying shear to the heated substrate to form a product. In an embodiment, applying heat to the substrate comprises introducing steam into the substrate. In another embodiment, applying heat to the substrate comprises melting the substrate.

Furthermore, embodiments described herein present a system for high shear oxidation, comprising a shear device with at least one inlet and at least one outlet and a mixing vessel with at least one inlet and at least one outlet, wherein an inlet of said shear device is in fluid communication with an outlet of said mixing vessel. In certain embodiments, a sparger is utilized to disperse a gas into said mixing vessel. In certain embodiments, said shear device and said mixing vessel form a loop for fluid communication in such a system. In some cases, pumps are included to control the flow rate and residence time of fluids passing through said shear device. In some other cases, temperature and pressure control units are included to regulate the temperature and pressure of said shear device. In some further cases, temperature and pressure control units are included to regulate the temperature and pressure of the fluid that enters said shear device. In yet some other cases, temperature and pressure control units are included to regulate the temperature and pressure of said mixing vessel. In some embodiments, the high shear oxidation system further comprises storage vessels in fluid communication with said shear device and said mixing vessel. In some cases, pumps are included to control the flow rates of the fluids entering or exiting said storage vessels. In some other cases, temperature and pressure control units are included to regulate the temperature and pressure of said storage vessels.

Embodiments described herein also present a method of high shear oxidation, comprising mixing an oxidant with a substrate to form a substrate-oxidant mixture and applying shear to said substrate-oxidant mixture to form a product. Said product includes ethylene oxide, propylene oxide, terephthalic acid, phenol, acrylonitrile, maleic anhydride, phthalic anhydride, nitric acid, caprolactam, oxidized polyethylene, oxidized polypropylene, oxidized polyethylene copolymers, and oxidized polypropylene copolymers. Suitable oxidant includes air, oxygen, ozone, peroxide, organic peroxide, halogen, oxygen-containing gas, and halogen-containing gas.

In certain embodiments, a gaseous substrate is compressed into liquid form prior to being mixed with an oxidant for high shear oxidation. In some cases, mixing of an oxidant with a substrate takes place prior to the application of shear stress in a shear device. In some other cases, mixing of an oxidant with a substrate and applying shear take place simultaneously in a shear device. In some further embodiments, a substrate and an oxidant are mixed in a bulk organic or inorganic liquid medium. The bulk organic liquid medium comprises aliphatic hydrocarbons. The bulk inorganic liquid medium includes water. In some cases, water is dissociated under severe high shear conditions to generate oxygen, which acts as the oxidant to oxidize the substrate.

In some embodiments, formed product is recycled to be subjected to additional application of shear. The mixing of said oxidant and said substrate, in some cases, includes dispersing said oxidant into said substrate or a liquid medium. For example, a gaseous oxidant is sparged into a continuous phase of said substrate or a liquid medium. In some other cases, additional mixing is accomplished by stirring or sonication. Process parameters that are controlled and coordinated are substrate-to-oxidant ratio, the flow rate or residence time of said substrate-oxidant mixture subjected to shear application, shear rate, duration of shear application, temperature, and pressure. The application of shear to said substrate-oxidant mixture accomplishes at least one of the following effects: (a) to functionalize said substrate with hydroxyl, ester, or acid groups; (b) to increase the acid value of said substrate; (c) to decrease the viscosity of said substrate; and (d) to decrease the average molecular weight of said substrate. In some cases, said substrate comprises polyethylene and polyethylene waxes. Light oxidation takes place via high shear oxidation process, which forms lower molecular weight polymers through cleaving and subsequent termination of higher molecular weight polymers, which results in viscosity breaking of such polymers. In some other cases, said substrate comprises high viscosity crude oils. Oxidation takes place in a controlled manner so that lower molecular weight compositions are formed through cleaving and subsequent termination of higher molecular weight compositions, which in turn causes viscosity reduction of heavy crudes.

High shear oxidation takes place in temperature ranges from room temperature to 1000° F. In some cases, the operation temperature ranges from room temperature to 600° F. In some other cases, temperature ranges from room temperature to 300° F. The operation pressure for high shear oxidation ranges from 14.7 psi to 1000 psi. In some other embodiments, pressure ranges from 14.7 psi to 300 psi. The operation mode for shear application to said substrate-oxidant mixture is continuous, semi-continuous, or batch-wise. Localized instantaneous temperatures and pressures within the high shear device, particularly within the shear gap and at the tip of the rotating high shear device, may be higher than those described for the bulk fluid present in the system.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1A:
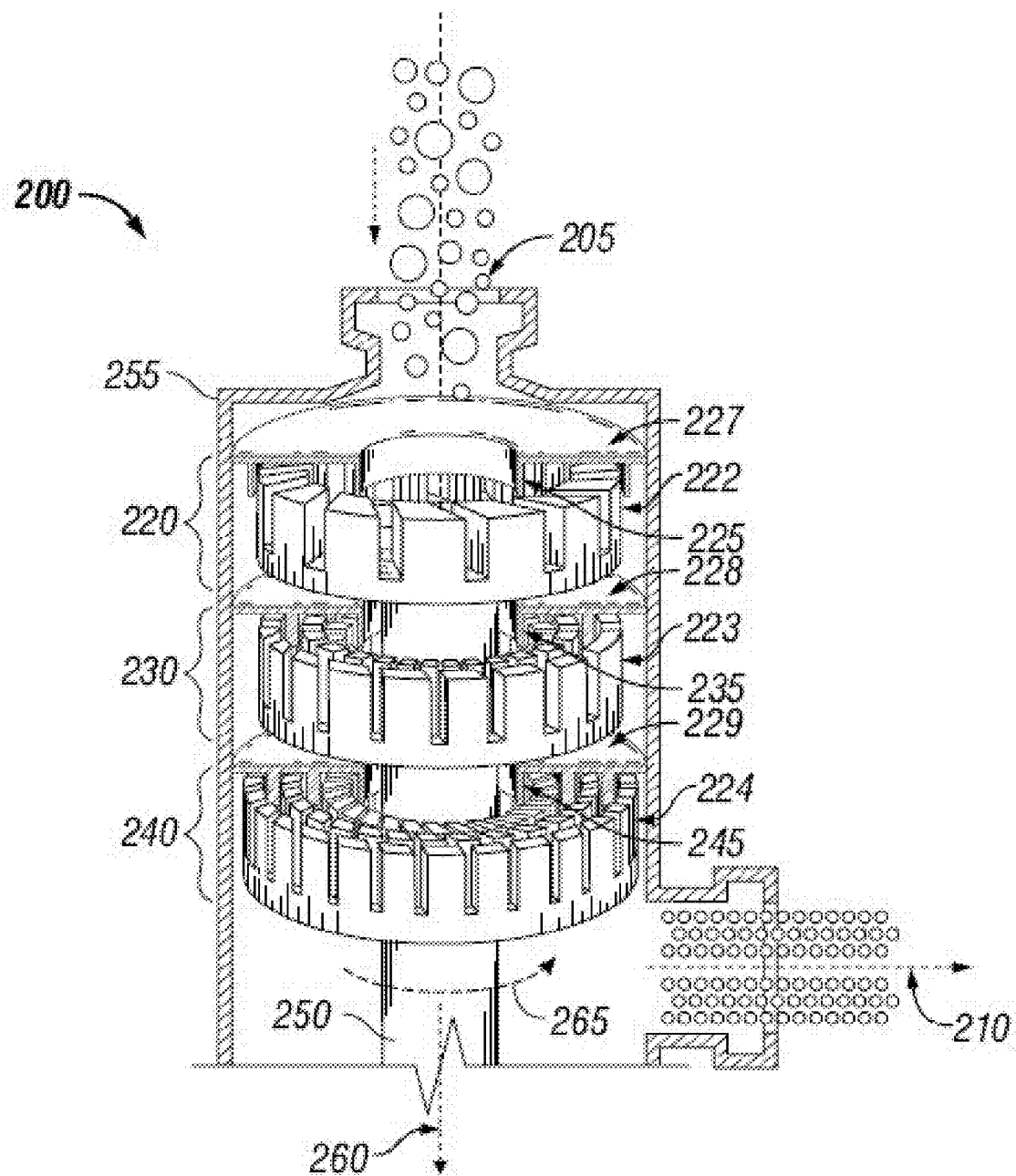
FIG. 1a is a longitudinal cross-section view of a three-stage shear device.

As used herein, the term "dispersion" refers to a liquefied mixture that contains at least two distinguishable substances (or "phases") that either will or will not readily mix and dissolve together. As used herein, a "dispersion" comprises a "continuous" phase (or "matrix"), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is miscible or immiscible, and continuous liquid phases throughout which solid particles are distributed. As used herein, the term "dispersion" encompasses continuous liquid phases throughout in which gas bubbles are distributed, continuous liquid phases throughout in which solid particles are distributed, continuous phases of a first liquid throughout in which droplets of a second liquid that is soluble or insoluble in the continuous phase are distributed, and liquid phases throughout in which any one or a combination of solid particles, miscible/immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, liquid 1/liquid 2 or gas/solid/liquid), depending on the nature of the materials selected for combination. In the strictest sense, the properties of a homogeneous phase (e.g., density, viscosity) are continuous throughout the phase. A liquid/liquid mixture may be a heterogeneous mixture, e.g., oil and water, with one phase dispersed as bubbles throughout the other phase. Such a mixture is homogeneous macroscopically, though at the microscopic level it is heterogeneous. Therefore, homogeneous herein is used in the macroscopic sense unless otherwise specified.

In this disclosure, the term "viscosity breaking" or "visbreaking" means viscosity reduction, the decrease of viscosity.

Certain terms are used throughout the following description and claims to refer to particular system components. This document does not intend to distinguish between components that differ in name but not function.

In the following description and in the claims, the terms "including" and "comprising" are used in an open-ended fashion, and thus should be interpreted to mean "including, but not limited to . . . ".

DETAILED DESCRIPTION

Shear Device Overview

High Shear devices (HSD) such as a high shear mixer, or high shear mill, are generally divided into classes based upon their ability to mix fluids. Mixing is the process of reducing the size of inhomogeneous species or particles within the fluid. One metric for the degree or thoroughness of mixing is the energy density per unit volume that the mixing device generates to disrupt the fluid particles. The classes are distinguished based on delivered energy density. There are three classes of industrial mixers having sufficient energy density to consistently produce mixtures or emulsions with particle or bubble sizes in the range of 0 to 50 μm.

Homogenization valve systems are typically classified as high energy devices. Fluid to be processed is pumped under very high pressure through a narrow-gap valve into a lower pressure environment. The pressure gradients across the valve and the resulting turbulence and cavitations act to break-up any particles in the fluid. These valve systems are most commonly used in milk homogenization and can yield average particle size range from about 0.01 μm to about 1 μm. At the other end of the spectrum are high shear mixer systems classified as low energy devices. These systems usually have paddles or fluid rotors that turn at high speed in a reservoir of fluid to be processed, which in many of the more common applications is a food product. These systems are usually used when average particle, globule or bubble, sizes of greater than 20 microns are acceptable in the processed fluid.

Between low energy-high shear mixers and homogenization valve systems, in terms of the mixing energy density delivered to the fluid, are colloid mills, which are classified as intermediate energy devices. The typical colloid mill configuration includes a conical or disk rotor that is separated from a complementary, liquid-cooled stator by a closely-controlled rotor-stator gap, which is maybe between 0.025 mm and 10.0 mm. Rotors are usually driven by an electric motor through a direct drive or belt mechanism. Many colloid mills, with proper adjustment, can achieve average particle, or bubble, sizes of about 0.01 μm to about 25 μm in the processed fluid. These capabilities render colloid mills appropriate for a variety of applications including colloid and oil/water-based emulsion processing such as that required for cosmetics, mayonnaise, silicone/silver amalgam formation, or roofing-tar mixing.

High Shear Device

Figure 1B:
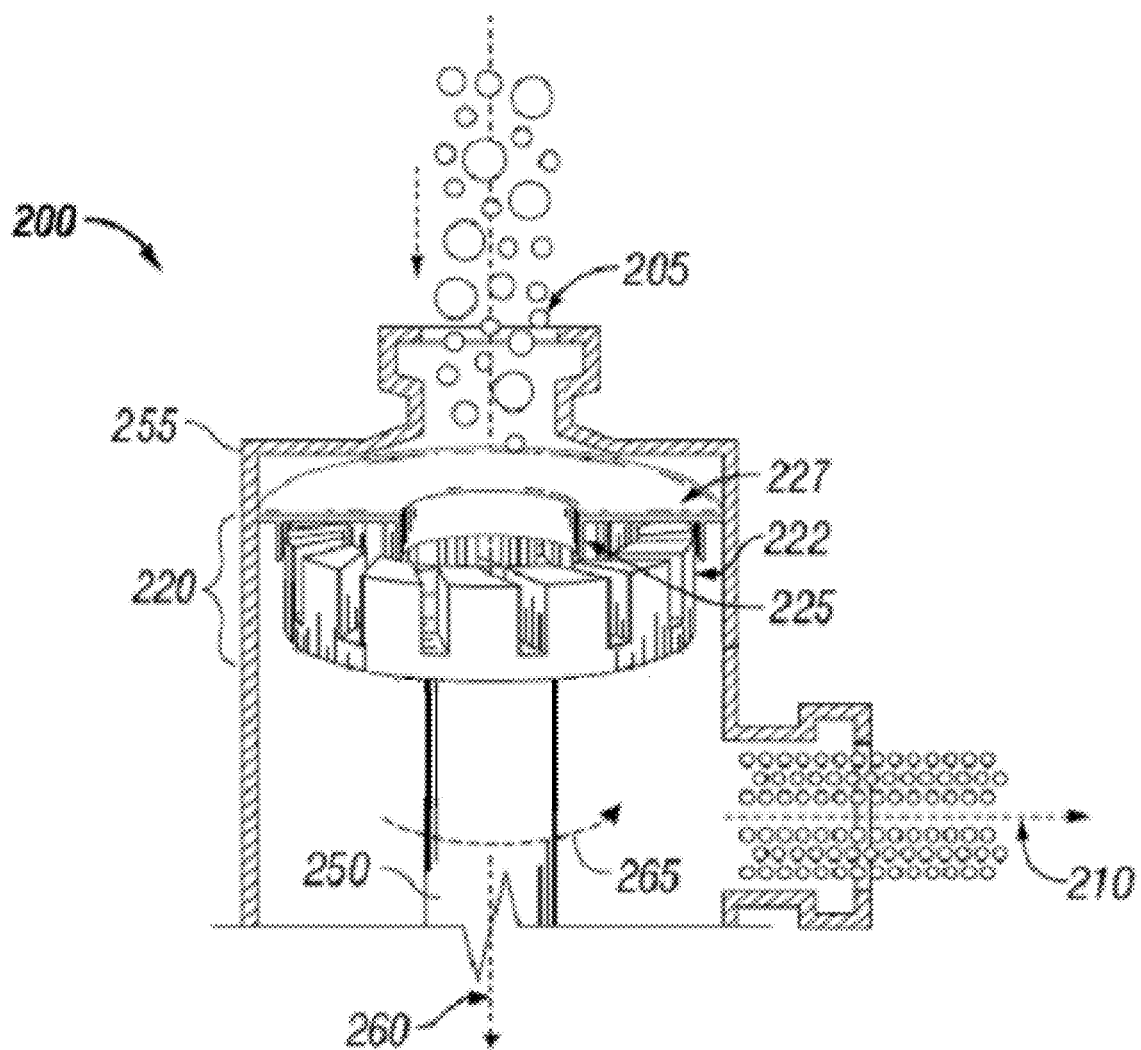
FIG. 1b is a longitudinal cross-section view of a one-stage shear device.

Referring now to FIG. 1a, there is presented a schematic diagram of a high shear device 200 with three rotor-stator combinations. The rotor-stator combinations may also be known as generators 220, 230, 240 or stages without limitation. Alternatively, the high shear device 200 comprises one generator as shown in FIG. 1b. In some other cases, the high shear device comprises two generators. As is readily seen, such high shear devices are constructed with one or more rotor-stator combinations according to the degree of mixing needed for each specific process.

The first generator 220 comprises rotor 222 and stator 227. The second generator 230 comprises rotor 223, and stator 228; the third generator comprises rotor 224 and stator 229. For each generator 220, 230, 240 the rotor is rotatably driven by input 250. The generators 220, 230, 240 rotate about axis 260 in rotational direction 265. Stator 227 is fixably coupled to the high shear device wall 255.

The generators include gaps between the rotor and the stator. The first generator 220 comprises a first gap 225; the second generator 230 comprises a second gap 235; and the third generator 240 comprises a third gap 245. The gaps 225, 235, 245 are between about 0.025 mm (0.01 in) and 10.0 mm (0.4 in) wide. Alternatively, the process comprises utilization of a high shear device 200 wherein the gaps 225, 235, 245 are between about 0.5 mm (0.02 in) and about 2.5 mm (0.1 in). In certain instances the gap is maintained at about 1.5 mm (0.06 in). Alternatively, the gaps 225, 235, 245 are different between generators 220, 230, 240. In certain instances, the gap 225 for the first generator 220 is greater than about the gap 235 for the second generator 230, which is greater than about the gap 245 for the third generator 240.

Additionally, the width of the gaps 225, 235, 245 may comprise a coarse, medium, fine, and super-fine characterization. Rotors 222, 223, and 224 and stators 227, 228, and 229 may be toothed designs. Each generator may comprise two or more sets of rotor-stator teeth, as known in the art. Rotors 222, 223, and 224 may comprise a number of rotor teeth circumferentially spaced about the circumference of each rotor. Stators 227, 228, and 229 may comprise a number of stator teeth circumferentially spaced about the circumference of each stator. In embodiments, the inner diameter of the rotor is about 11.8 cm. In embodiments, the outer diameter of the stator is about 15.4 cm. In further embodiments, the rotor and stator may have an outer diameter of about 60 mm for the rotor, and about 64 mm for the stator. Alternatively, the rotor and stator may have alternate diameters in order to alter the tip speed and shear pressures. In certain embodiments, each of three stages is operated with a super-fine generator, comprising a gap of between about 0.025 mm and about 3 mm.

High shear device 200 is fed a reaction mixture comprising the feed stream 205. Feed stream 205 comprises an emulsion of the dispersible phase and the continuous phase. Emulsion refers to a liquefied mixture that contains two distinguishable substances (or phases) that will not readily mix and dissolve together. Most emulsions have a continuous phase (or matrix), which holds therein discontinuous droplets, bubbles, and/or particles of the other phase or substance. Emulsions may be highly viscous, such as slurries or pastes, or may be foams, with tiny gas bubbles suspended in a liquid. As used herein, the term "emulsion" encompasses continuous phases comprising gas bubbles, continuous phases comprising particles (e.g., solid catalyst), continuous phases comprising droplets of a fluid that is substantially insoluble in the continuous phase, and combinations thereof.

Feed stream 205 is pumped through the generators 220, 230, 240, such that product dispersion 210 is formed. In each generator, the rotors 222, 223, 224 rotate at high speed relative to the fixed stators 227, 228, 229. The rotation of the rotors pumps fluid, such as the feed stream 205, between the outer surface of the rotor 222 and the inner surface of the stator 227 creating a localized high shear condition. The gaps 225, 235, 245 generate high shear forces that process the feed stream 205. The high shear forces between the rotor and stator functions to process the feed stream 205 to create the product dispersion 210. Each generator 220, 230, 240 of the high shear device 200 has interchangeable rotor-stator combinations for producing a narrow distribution of the desired bubble size, if feedstream 205 comprises a gas, or globule size, if feedstream 205 comprises a liquid, in the product dispersion 210.

The product dispersion 210 of gas particles, or bubbles, in a liquid comprises an emulsion. In embodiments, the product dispersion 210 may comprise a dispersion of a previously immiscible or insoluble gas, liquid or solid into the continuous phase. The product dispersion 210 has an average gas particle, or bubble, size less than about 1.5 µm; preferably the bubbles are sub-micron in diameter. In certain instances, the average bubble size is in the range from about 1.0 µm to about 0.1 µm. Alternatively, the average bubble size is less than about 400 nm (0.4 µm) and most preferably less than about 100 nm (0.1 µm).

Tip speed is the velocity (m/sec) associated with the end of one or more revolving elements that is transmitting energy to the reactants. Tip speed, for a rotating element, is the circumferential distance traveled by the tip of the rotor per unit of time, and is generally defined by the equation $V$ (m/sec) $=\pi \cdot D \cdot n$, where $V$ is the tip speed, $D$ is the diameter of the rotor, in meters, and $n$ is the rotational speed of the rotor, in revolutions per second. Tip speed is thus a function of the rotor diameter and the rotation rate. Also, tip speed may be calculated by multiplying the circumferential distance transcribed by the rotor tip, $2\pi R$, where R is the radius of the rotor (meters, for example) times the frequency of revolution (for example revolutions (meters, for example) times the frequency of revolution (for example revolutions per minute, rpm).

For colloid mills, typical tip speeds are in excess of 23 m/sec (4500 ft/min) and can exceed 40 m/sec (7900 ft/min). For the purpose of the present disclosure the term 'high shear' refers to mechanical rotor-stator devices, such as mills or mixers, that are capable of tip speeds in excess of 5 m/sec (1000 ft/min) and require an external mechanically driven power device to drive energy into the stream of products to be reacted. A high shear device combines high tip speeds with a very small shear gap to produce significant friction on the material being processed. Accordingly, a local pressure in the range of about 1000 MPa (about 145,000 psi) to about 1050 MPa (152,300 psi) and elevated temperatures at the tip of the shear mixer are produced during operation. In certain embodiments, the local pressure is at least about 1034 MPa (about 150,000 psi). The local pressure further depends on the tip speed, fluid viscosity, and the rotor-stator gap during operation.

An approximation of energy input into the fluid (kW/L/min) can be made by measuring the motor energy (kW) and fluid output (L/min). In embodiments, the energy expenditure of a high shear device is greater than 1000 W/m³. In embodiments, the energy expenditure is in the range of from about 3000 W/m³ to about 7500 W/m³. The high shear device 200 combines high tip speeds with a very small shear gap to produce significant shear on the material. The amount of shear is typically dependent on the viscosity of the fluid. The shear rate generated in a high shear device 200 may be greater than 20,000 s⁻¹. In embodiments, the shear rate generated is in the range of from 20,000 s⁻¹ to 100,000 s⁻¹.

The high shear device 200 produces a gas emulsion capable of remaining dispersed at atmospheric pressure for at least about 15 minutes. For the purpose of this disclosure, an emulsion of gas particles, or bubbles, in the dispersed phase in product dispersion 210 that are less than 1.5 µm in diameter may comprise a micro-foam. Not to be limited by a specific theory, it is known in emulsion chemistry that sub-micron particles, or bubbles, dispersed in a liquid undergo movement primarily through Brownian motion effects. Bubbles generated in the high shear process may have greater mobility and contact surface with the continuous phase, thereby facilitating and accelerating the reaction through enhanced transport of reactants.

Selection of the high shear device 200 is dependent on throughput requirements and desired particle or bubble size in the outlet dispersion 210. In certain instances, high shear device 200 comprises a Dispax Reactor® of IKA® Works, Inc. Wilmington, N.C. and APV North America, Inc. Wilmington, Mass. Model DR 2000/4, for example, comprises a belt drive, 4 M generator, PTFE sealing ring, inlet flange 1" sanitary clamp, outlet flange ¾" sanitary clamp, 2 HP power, output speed of 7900 rpm, flow capacity (water) approximately 300 l/h to approximately 700 l/h (depending on generator), a tip speed of from 9.4 m/s to about 41 m/s (about 1850 ft/min to about 8070 ft/min). Several alternative models are available having various inlet/outlet connections, horsepower, nominal tip speeds, output rpm, and nominal flow rate.

Without wishing to be limited to a particular theory, it is believed that the level or degree of high shear mixing is sufficient to increase rates of mass transfer and may also produce localized non-ideal conditions that enable reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required.

Cavitation may also increase rates of transport processes by producing local turbulence and liquid micro-circulation (acoustic streaming).

High Shear Oxidation

Figure 2A:
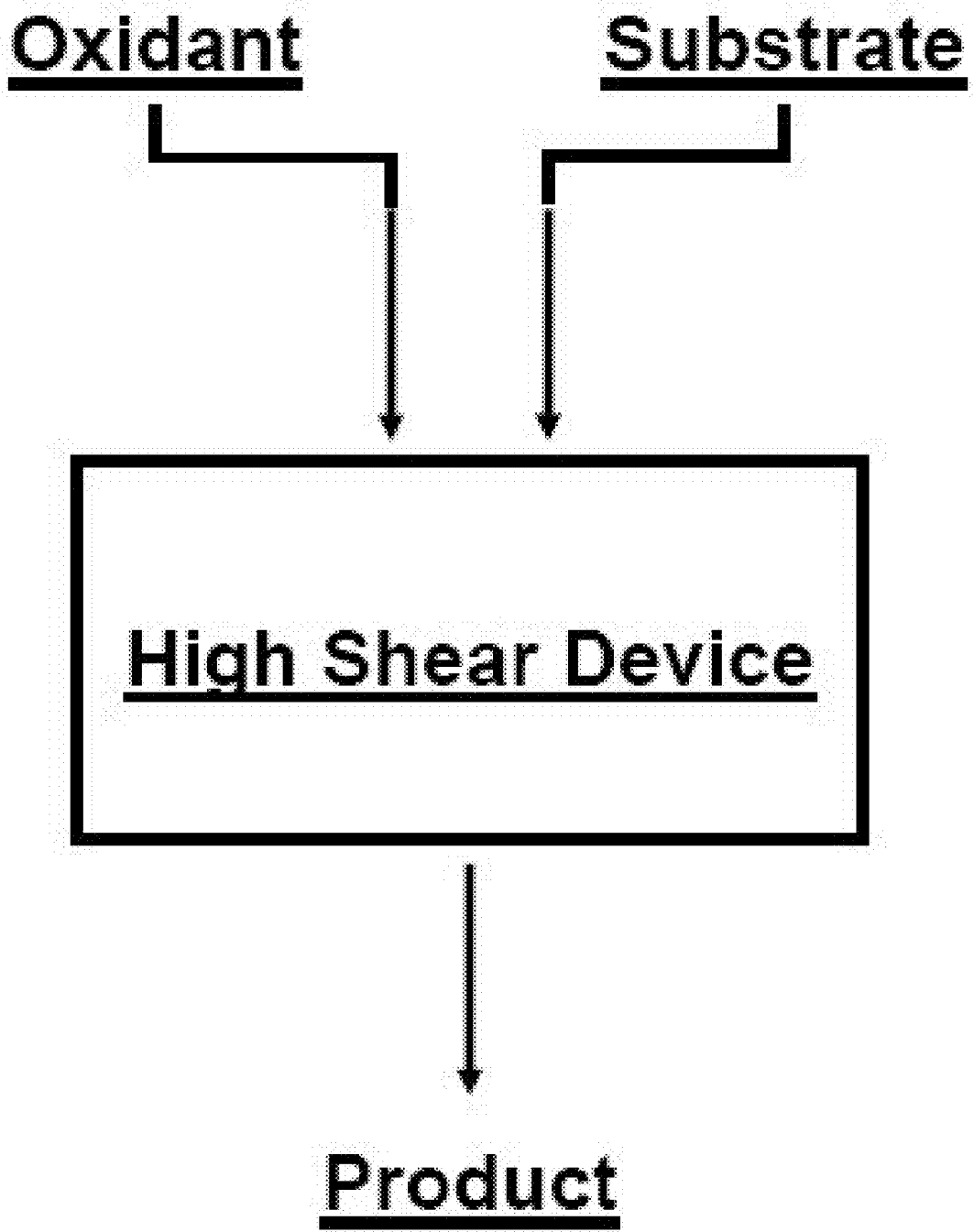
FIG. 2a schematically illustrates the application of a high shear device in an oxidation process, in accordance with an embodiment of the invention.

FIG. 2a represents the application of a high shear device in an oxidation process. A substrate and an oxidant (e.g., air, oxygen, ozone, peroxide, organic peroxide, and halogen) are passed through a high shear device to produce a desired product. Desired products include ethylene oxide, propylene oxide, terephthalic acid, phenol, acrylonitrile, maleic anhydride, phthalic anhydride, nitric acid, caprolactam, oxidized polyethylene, oxidized polypropylene, oxidized polyethylene copolymers, and oxidized polypropylene copolymers. In some embodiments, a mixing step is included prior to subjecting the substrate-oxidant mixture to high shear.

In some embodiments, a liquid polymer is to be oxidized, such as molten polyethylene wax. The polymer is melted and becomes the bulk fluid passing through the system. An oxidant (e.g., oxygen, ozone) is added in a minor amount over a period of time to induce oxidation. The degree and rate of oxidation are controlled because excessive oxidation or over-rapid oxidation often results in undesirable cross-linking of polymers. In some other embodiments, smaller molecules are oxidized, such as ethylene and propylene, which are gaseous under standard temperature and pressure. Therefore, gaseous material is compressed into the liquid form and then sent through the high shear device with a suitable oxidant to be oxidized. Alternatively, oxidation is carried out in a bulk organic or inorganic liquid medium, such as water and aliphatic hydrocarbons. Such a medium is passed through the system and gaseous material is injected along with a suitable oxidant into the high shear device where oxidation takes place. In some cases, shear conditions are severe enough to cause water dissociation to generate oxygen. In such cases, the generated oxygen may be used as the oxidant in the high shear oxidation process.

In certain embodiments, alkenes (e.g., ethylene) are oxidized, which reactions are thermodynamically favorable and are highly exothermic. Traditional methods of producing oxidized alkenes are carried out in a gaseous phase and have resulted in explosions and deaths. In addition, this reaction must be controlled so that alkenes are not completely oxidized to form carbon dioxide and water (see United States Patent Application No. 20060054314 and U.S. Pat. No. 7,153,985). Using high shear and a liquid medium to induce oxidation of alkenes allows for better control of the oxidation process because the liquid medium provides for rapid cooling of the exothermic reaction while the reaction taking place is confined mainly within the high shear unit.

Figure 2B:
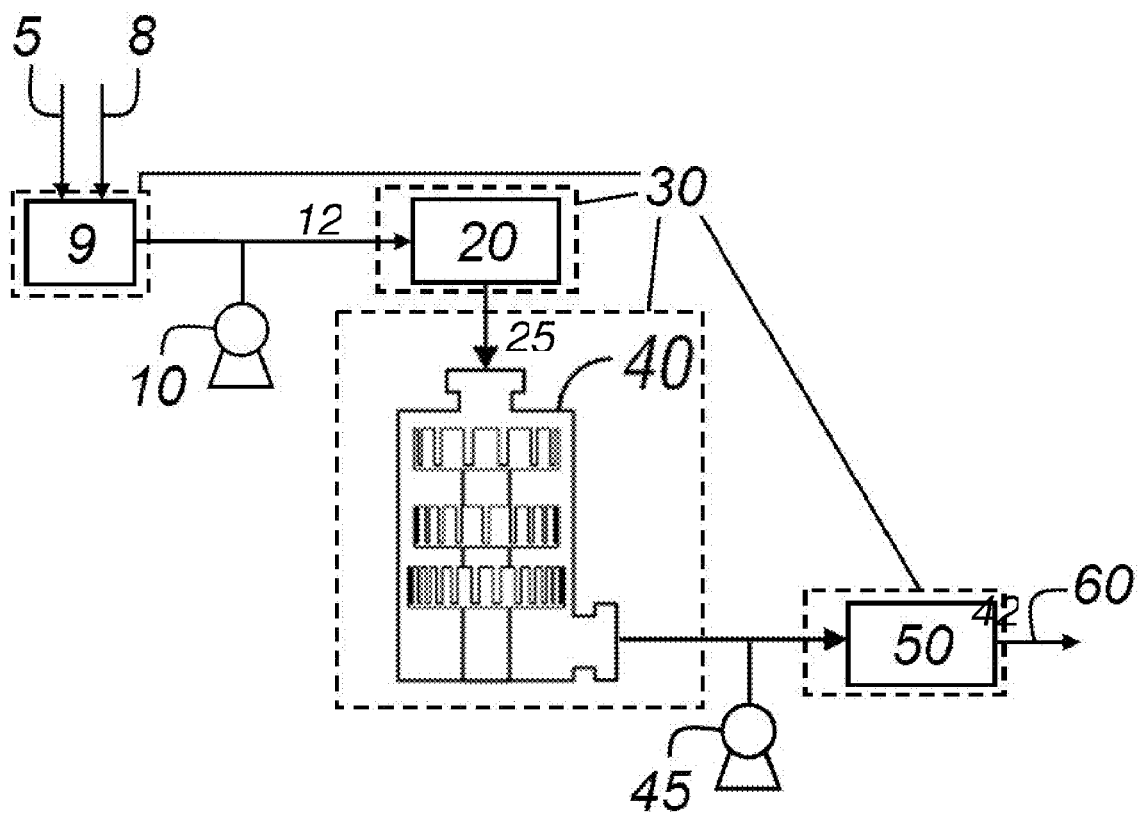
FIG. 2b is a schematic process flow diagram for the application of a high shear device in an oxidation process, in accordance with an embodiment of the invention.

FIG. 2b schematically illustrates a high shear oxidation process according to one embodiment of the invention. An oxidant (via stream 5) and a substrate (via stream 8) are added into mixing vessel 9 with a temperature and pressure control unit 30. In certain embodiments, gaseous oxidant is added into mixing vessel 9 through a sparger to facilitate mixing with the continuous phase. In some embodiments, additional mixing is accomplished in mixing vessel 9 by utilizing a suitable mixing method known to one skilled in the art, such as stirring and sonication. The temperature and pressure control unit 30 is any device or system known to one skilled in the art and has the capacity to increase or decrease the temperature and pressure of mixing vessel 9. In some embodiments, control unit 30 is able to heat up the content to 1200° F. and increase the pressure to 1000 psi. Alternatively, an additional temperature and pressure control system may be added after the oxidant and substrate are mixed in vessel 9, wherein control unit 30 for vessel 9 is optional. Mixing vessel 9 is configured to be in fluid communication with storage vessel 20 via stream 12. Storage vessel 20 is equipped with a temperature and pressure control unit 30 in order to maintain the temperature and pressure obtained in mixing vessel 9. In some embodiments, a pump 10 is included to control the flow into storage vessel 20. Pump 10 is configured for either continuous or semi-continuous operation, and may be any suitable pumping device. In alternative embodiments, storage vessel 20 is omitted.

Storage vessel 20 is configured to be in fluid communication with shear device 40 (at inlet 205 in FIG. 1a and FIG. 1b), wherein the fluid connection may be any as known to one skilled in the art. The temperature and pressure of shear device 40 is regulated by a temperature and pressure control unit 30, wherein control unit 30 is any device or system known to one skilled in the art and has the capacity to increase or decrease the temperature and pressure of shear device 40. In some embodiments, control unit 30 is able to heat up the content to 1200° F. and increase the pressure to 1000 psi. Because many oxidation reactions are exothermic and it is expected that the reaction rate is increased by the application of high shear, it is necessary to cool down shear device 40 in order to prevent the oxidation reactions from running away.

Shear device 40 is configured to be in fluid communication via stream 42 (at outlet 210 in FIG. 1) with storage vessel 50, wherein the fluid connection may be any as known to one skilled in the art. The temperature and pressure of storage vessel 50 are regulated by a control unit 30, wherein control unit 30 is any device or system known to one skilled in the art and has the capacity to increase or decrease the temperature and pressure of vessel 50. In certain embodiments, control unit 30 for vessel 50 is omitted. In some embodiments, a pump 45 is included to control the flow into vessel 50. Pump 45 is configured for either continuous or semi-continuous operation, and may be any suitable pumping device. In alternative embodiments, storage vessel 50 is omitted. Processed mixture is extracted via stream 60 for further processing. In some embodiments, stream 60 is recycled to shear device 40 via stream 8, 12, or 25 (not shown in FIG. 2b) for further oxidation.

Functionalization of Polyethylene

Polyethylene is one of the most widely used polymers with over 60 million tons of production worldwide every year. Oxidized polyethylene waxes are useful for making high quality emulsions, wherein functional or polar groups (e.g., acid and ester groups) are desirable. Without wishing to be limited by a theory, an acid value of greater than 16 mgKOH/g is recommended for emulsion manufacture. High shear oxidation process provides an efficient, economical, and flexible way to oxidize low molecular weight polyethylene and polyethylene waxes to add functional groups to the polymer backbone.

High shear oxidation of polyethylene and polyethylene waxes takes place in a temperature range from room temperature to 1000° F. In some cases, high shear oxidation takes place from room temperature to 600° F. The operation pressure ranges from 14.7 psi to 1000 psi. In some embodiments, high shear oxidation takes place from 14.7 psi to 300 psi. In some cases, high shear oxidation continues for a few minutes; in some other cases, high shear oxidation continues for hours. Suitable oxidants include air, oxygen, ozone, peroxide, organic peroxide, halogen, oxygen-containing gas, and halogen-containing gas. The polymer-to-oxidant ratio is determined by the degree of desired oxidation for each specific process, which is monitored by the acid number or saponification number of the obtained products.

Furthermore, the residence time, flow rate (or volume), shear rate, operation temperature and pressure, oxidant type, polymer feed, and desired products are inter-related in the high shear oxidation process. For example, if the polymer feed, desired products, and production rate are given, it is possible to use oxygen at ambient temperature and pressure to accomplish desired oxidation level within a few hours. If air is used instead of oxygen, the process may need to continue much longer to accomplish the same level of oxidation. If organic peroxide is used instead, the operation temperature may need to be increased to facilitate the dissociation of the organic peroxide for polymer oxidation. In addition, oxidizing polyethylene at too quick a rate results in undesirable cross linking of polymer. Cross linking occurs when two end groups of free radicals of a polymer combine. Cross linked polyethylene wax is generally not soluble and appears as 'fish eyes' in the polymer melt.

Viscosity Breaking

Oxidation of polymers also has the effect of cleaving long polymer chains into shorter ones and thus reducing the viscosity (viscosity breaking or visbreaking). High shear oxidation of polyethylene and polyethylene waxes for viscosity breaking takes place in a temperature range from room temperature to 1000° F. In some cases, high shear oxidation takes place from room temperature to 600° F. In some other cases, high shear oxidation takes place from room temperature to 300° F. The operation pressure ranges from 14.7 psi to 1000 psi. In some embodiments, high shear oxidation takes place from 14.7 psi to 300 psi. In some cases, high shear oxidation continues for a few minutes; in some other cases, high shear oxidation continues for hours. Suitable oxidants include air, oxygen, ozone, peroxide, organic peroxide, halogen, oxygen-containing gas, and halogen-containing gas. The polymer-to-oxidant ratio is determined by the degree of desired viscosity breaking for each specific process. In some embodiments, oxidation is controlled so that no substantial functionalization of the polymer backbone takes place but only the forming of lower molecular weight polymers through cleaving and subsequent termination of higher molecular weight polymers.

The residence time, flow rate (or volume), shear rate, operation temperature and pressure, oxidant type, polymer feed, and desired products are inter-related in the high shear oxidation process. For example, if the polymer feed, desired products, and production rate are given, it is possible to use oxygen at ambient temperature and pressure to accomplish the desired level of viscosity reduction within a few hours. If air is used instead of oxygen, the process may need to continue much longer to accomplish the same level of viscosity reduction. If organic peroxide is used instead, the operation temperature may need to be increased to facilitate the dissociation of the organic peroxide for polymer oxidation that leads to viscosity reduction. Cross-linking of polymers is avoided by controlling the oxidation rate, which is determined by flow rate, shear rate, operation temperature and pressure, oxidant type, and polymer feed.

In some other embodiments, high shear oxidation is utilized to adjust the rheological properties of high viscosity crude oils via light oxidation. Heavy crudes are viscous and dense, comprising heavier molecular compositions. Such properties make them more challenging in production, transportation, and refining compared to light crudes. High viscosity crude oils are mixed with suitable oxidants and then the mixture is passed through a high shear device. Suitable oxidants include air, oxygen, ozone, peroxide, organic peroxide, halogen, oxygen-containing gas, and halogen-containing gas. The crude-to-oxidant ratio is determined by the degree of desired viscosity reduction. In some embodiments, oxidation is controlled so that lower molecular weight compositions are formed through cleaving and subsequent termination of higher molecular weight compositions. Other controllable process parameters comprise temperature, pressure, shear rate, residence time, flow rate, and total high shear oxidation time.

Figure 3A:
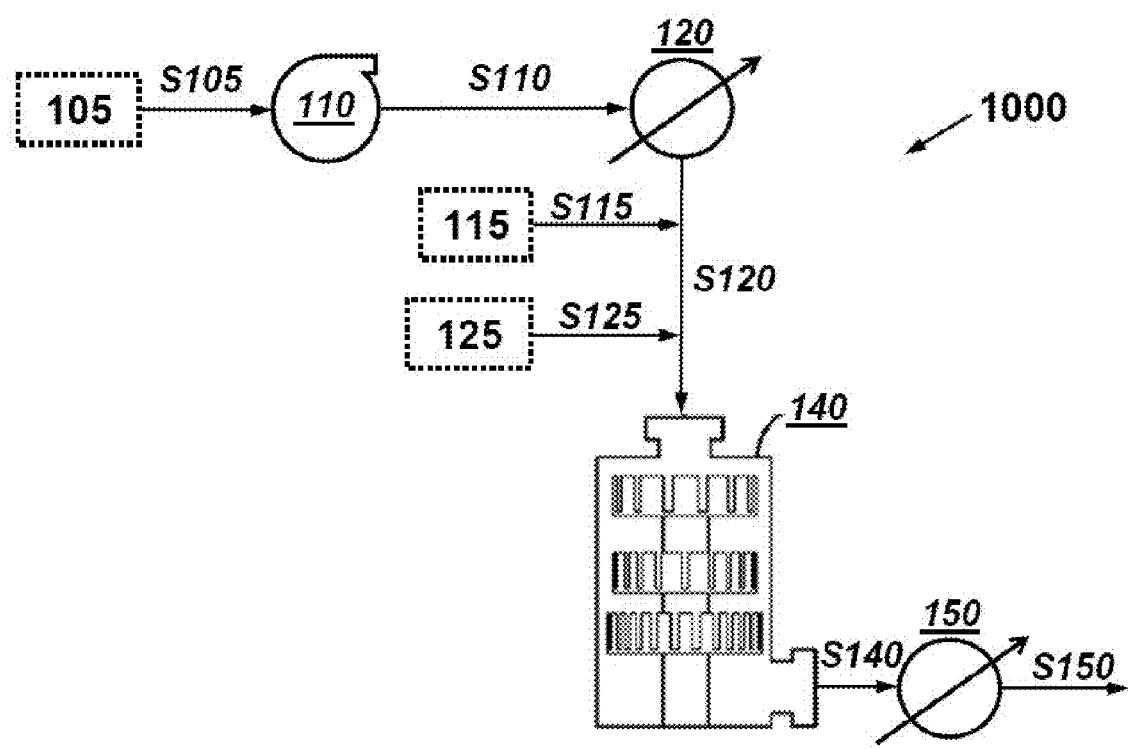
FIG. 3a schematically illustrates a high shear oxidation system for viscosity breaking, in accordance with an embodiment of the invention.

In one embodiment, heat and shear are applied to wax to reduce its viscosity. In some cases, heat is applied to the wax by steam injection. In another embodiment, an oxidant is combined with wax and shear is applied to the mixture to reduce wax viscosity. In yet a further embodiment, heat, oxidant, and shear are applied to wax for visbreaking. FIG. 3a illustrates a high shear oxidation system 1000 for viscosity reduction according to an embodiment of the invention. System 1000 comprises pump 110, heat exchangers 120 and 150, and shear device 140. System 1000 also comprises substrate source 105, oxidant source 115, and steam source 125.

A substrate is sent from substrate source 105 to pump 110 as stream S105, exits as stream S110, passes through heat exchanger 120, and exits as stream 5120. Substrate 105 comprises polymers, waxes, or combinations thereof. In some cases, substrate 105 is a raw material. In some other cases, substrate 105 is processed, e.g., melted wax (using a melter before shear device 140), refined wax. In certain cases, substrate 105 comprises hot polyethylene wax, the temperature of which is from about 160° C. to about 400° C., alternatively from about 180° C. to about 250° C., alternatively about 200° C.

An oxidant source 115 sends stream S115 to be mixed with stream S120. In some cases, the oxidant comprises an oxygen-containing gas, such as air, oxygen. In some embodiments, a steam source 125 sends stream S125 to be mixed with stream S120. We believe that the use of steam helps in the viscosity reduction process. Without wishing to be limited by any theory, the inclusion of steam in the visbreaking process promotes more uniform oxidation and adds additional heat and possibly free radicals.

Stream S120, after being mixed with streams S115 and S125, is sent to shear device 140, where viscosity breaking of the substrate takes place. Stream S140 exits shear device 140 and enters heat exchanger 150 to be cooled, and exits as stream S150. In some embodiments, stream S150 is further processed. For example, stream S150 passes through a flash system to rid of any unwanted volatile components before it is stored and transported. In some cases, stream S150 is recycled (not shown in FIG. 3a) to be used as the substrate or mixed with the substrate for further viscosity reduction.

Adhesive Formulation

Waxes produced by the present invention are particularly suitable for use in hot melt adhesive formulations. A hot melt adhesive is typically comprised of three major components, wax, tackifiers and resin. In hot melt adhesive applications low viscosity waxes are desirable to reduce the overall viscosity of the formulated adhesive and allow for penetration of the adhesive into the substrate thus allowing for good bond adhesion. The ability to control viscosity of polyethylene waxes with the present invention is therefore desirable. Additionally, polyethylene homopolymer waxes are non polar and hot melt adhesives often utilize polar components for the resin and tackifiers, such as ethylene vinyl acetate and rosin esters. The ability to functionalize a polyethylene wax and add polarity will enable increased compatibility between the resin and wax components of the hot melt adhesive components thereby enabling greater formulation flexibility.

Because the present invention allows for creation and control of a broader range of properties for hot melt adhesive formulations, it is also possible to utilize the present invention to create a polymer that replaces both the wax and resin components of a hot melt adhesive formulation by providing both a high and low molecular weight feed to the high shear device. Alternatively a fully formulated adhesive may also be formulated by the addition of tackifiers to the inlet or following the high shear device. Feeding of mixtures of polymers and/or tackifiers to the high shear device may be accomplished by any means known to those experienced in the art but would typically involve an extruder device that can masticate high molecular weight resin and other components.

Operation Modes

With the embodiments described above, it is easily conceivable to one skilled in the art that high shear oxidation may be carried out continuously, semi-continuously, or batchwise. Material processed through the high shear device may alternatively be recycled or sent through additional high shear devices to enhance viscosity reduction and/or functionalization. Therefore, operation modes of the presented high shear oxidation process are not to limit the scope of the invention but to be considered as equivalents of the invention.

EXAMPLES

The addition of steam to the inlet of the high shear device allows for greater control of feedstock inlet temperatures. Within the high shear device the steam may also contribute to the chemical reactions that are occurring. Not to be limited by a specific theory, it is known that steam can dissociate under extreme temperature and pressure conditions that exist in acoustical and hydrodynamic cavitation conditions (see Pg 315 Cavitation reaction engineering By Yatish T. Shah, A. B. Pandit, V. S. Moholkar; ISBN-13: 978-0306461415; see Page 34, Practical sonochemistry: uses and applications of ultrasound By T. J. Mason, Dietmar Peters; ISBN-10: 1898563837 and Pg 360 Cavitation By F. Ronald Young, ISBN-13: 9781860941986). Within the high shear device of the present invention the steam may dissociate and the free hydrogen can react to terminate polymer chains that have broken and/or take part in other chemical reactions that may occur. The hydroxyl components of dissociated steam may also react similarly. In the examples below where steam and oxygen are injected into the high shear unit with wax, one would normally expect to see acid chemical species created. There is no acid detected and no cross-linking observed, yet there is substantial viscosity reduction and even a shift in density of the wax. In addition to hydrogen termination, chemical species that may be present in the final product after having gone through the shear device would include ketones, alcohols, esters, aldehydes and other oxygenated species.

Example 1

A polyethylene copolymer (ethylene butene-1) is used as the feedstock for viscosity reduction as disclosed herein. The properties of the polyethylene copolymer feedstock are summarized in Table 1.

TABLE 1

| Property | Value | Method |
|---|---|---|
| Viscosity | 180 centipoise | ASTM D3236 @ 149° C. |
| Density | 0.91 g/cc | ASTM D1505 |
| Drop Point | 118° C. | ASTM D3954 |
| Hardness | 0.5 dmm | ASTM D1321 |
| Acid No. | Nil.* | mg KOH/gm |
| Viscosity | 180 | ASTM D3236 @ 149° C. |
| Density | 0.91 | ASTM D1505 |

TABLE 1-continued

| Property | Value | Method |
|---|---|---|
| Drop Point | 118 | ASTM D3954 |
| Hardness | 0.5 | ASTM D1321 |
| Acid No. | Nil.* | mg KOH/gm |

*"Nil.": acid No. <1 mg KOH/gm, so throughout the examples
1 centipoise = 1 CPS = 1 mPas The feedstock is melted by being heated to 180° C. Then the heated feedstock is mixed with air and steam prior to entering a high shear device (IKA model DR2000/20). Steam is fed at a pressure of 8 kg/cm$^2$ and air at 7 kg/cm$^2$. The flow rate through the high shear device is 8 MT/hr. The effluent from the high shear device is heated to 218° C. and then passes through a flash evaporator at 610 mmHg to remove volatile components. The resulting polymer has the following properties as shown in Table 2. The viscosity of the feedstock is reduced by 66 centipoise, about 37% reduction.

TABLE 2

| Property | Value | Method |
|---|---|---|
| Viscosity | 114 centipoise | ASTM D3236 @ 149° C. |
| Acid No. | Nil. | mg KOH/gm |

Example 2

To demonstrate the effect of reduced steam flow, the polyethylene copolymer from Example 1 is processed as follows. The feedstock is melted by being heated to 222° C. Then the heated feedstock is mixed with air and steam prior to entering a high shear device (IKA model DR2000/20). The steam is fed at about 5% of the rate in Example 1 and the air at 7 kg/cm$^2$. The flow rate through the high shear device is 8 MT/hr. The effluent from the high shear device is heated to 218° C. and then passes through a flash evaporator at 590 mmHg to remove volatile components. The processed polymer has properties as shown in Table 3.

TABLE 3

| Property | Value | Method |
|---|---|---|
| Viscosity | 83 centipoise | ASTM D3236 @ 149° C. |
| Acid No. | Nil. | mg KOH/gm |

The viscosity of the feedstock is reduced by 97 centipoise, about 54% reduction.

Example 3

The product produced in Example 1 is blended with the product produced in Example 2. The blended polymer product has the following properties as shown in Table 4.

TABLE 4

| Property | Value | Method |
|---|---|---|
| Viscosity | 100 centipoise | ASTM D3236 @ 149° C. |
| Acid No. | Nil. | mg KOH/gm |

The blended polymer product is then used as the feedstock, which is melted by being heated to 218° C. and mixed with air and steam prior to entering a high shear device (IKA model DR2000/20). Steam is fed at about 5% of the rate in Example 1 and air at 7 kg/cm². The flow rate through the high shear device is 7.8 MT/hr. The effluent from the high shear device is heated to 218° C. and then passes through a flash evaporator at 580 mmHg to remove volatile components. The holding tank following the high shear device has a retention time of approximately 5 min, during which time the viscosity continues to drop. If desired, after passing through the high shear device, the polymer may be held at elevated temperatures and/or pressures for further viscosity reductions. The resulting polymer has the following properties as shown in Table 5.

TABLE 5

| Property | Value | Method |
|---|---|---|
| Viscosity | 56 centipoise | ASTM D3236 @ 149° C. |
| Density | 0.88 g/cc | ASTM D1505 |
| Drop Point | 105° C. | ASTM D3954 |
| Hardness | 0.6 dmm | ASTM D1321 |
| Acid No. | Nil. | mg KOH/gm |

The results show that the high shear device is not only able to reduce viscosity, but also modify the drop point and density of a polymer. The crystallinity of the polymer on the microscopic scale dictates some macroscopic properties of the polymer, such as the density and drop point (related to the melting characteristics of polymer). Therefore, modification of the density and drop point of a polymer is an indication of the modification of the crystallinity of the polymer.

Furthermore, there is no observation of any substantial increase in the acid No. (acid value) of the processed wax, which is normally associated with functionalization of the polymer wax via oxidation. Therefore, it is probable that the polymer is cleaved via oxidation, which causes its viscosity to be reduced. The resulting polymer may comprise hydroxyl, ketone, un-saturation, hydrogen addition, or other groups where cleaving has taken place.

Example 4

Figure 3B:
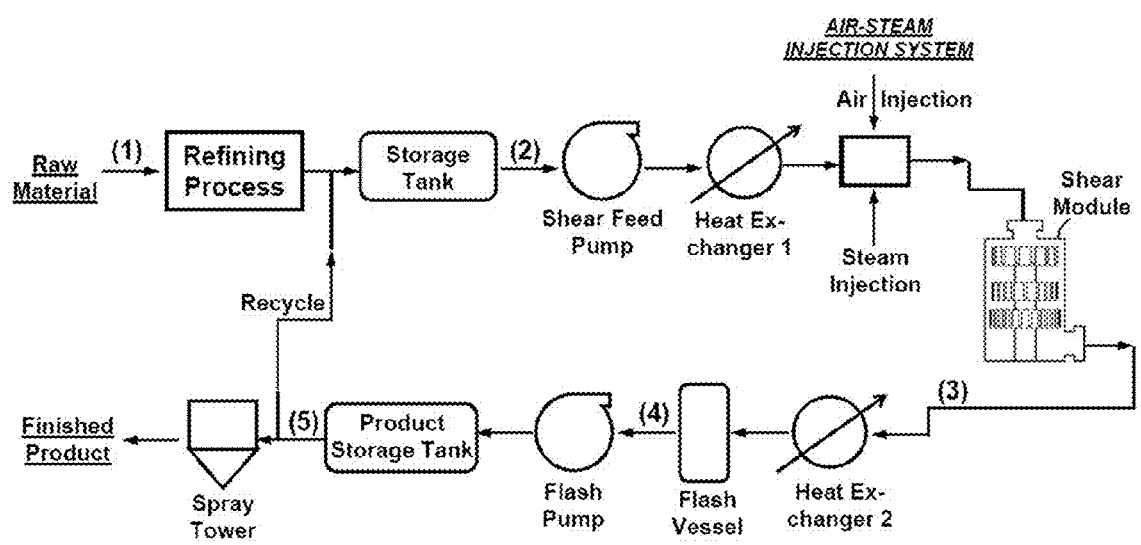
FIG. 3b schematically illustrates a high shear oxidation process for viscosity breaking, in accordance with an embodiment of the invention.

FIG. 3b illustrates a high shear oxidation process to reduce the viscosity of polyethylene wax (PE wax). Five sampling positions (1)-(5) are labeled in FIG. 3b and three sets of samples are obtained at three different time points. Position (1): the property of the raw material; position (2): the property of the raw material mixed with recycled product; position (3): wax property after passing through shear module; position (4): wax property after passing through the flash vessel; and position (5): wax property after passing through the product storage tank. The properties of the PE wax and some operation parameters are summarized in Tables 6-8.

TABLE 6

| | | | | Time Point I | | | | | |
|---|---|---|---|---|---|---|---|---|---|
| Position | Viscosity CPS | Flash Point °C. | Hardness dmm | Melting Point °C. | Acid No. mg KOH/gm | Pressure kg/cm² | Temperature °C. | Flow Rate m3/hr | Vacuum mmHg | Density g/cc |
| (1) | 32 | 256 | 0.5 | — | Nil. | — | — | — | — | 0.87 |
| (2) | 17 | 220 | 10 | 94 | Nil. | — | 150 | — | — | 0.84 |
| (3) | 16.8 | 218 | 11 | 94 | Nil. | 4.8 | 178 | 5.1 | — | 0.76 |
| (4) | 15.1 | 203 | 12 | 95 | Nil. | — | — | — | −621 | 0.803 |
| (5) | 15.1 | 203 | 12 | 95 | | | | | | |

TABLE 7

| | | | | Time Point II | | | | | |
|---|---|---|---|---|---|---|---|---|---|
| Position | Viscosity CPS | Flash Point °C. | Hardness dmm | Melting Point °C. | Acid No. mg KOH/gm | Pressure kg/cm² | Temperature °C. | Flow Rate m3/hr | Vacuum mmHg | Density g/cc |
| (1) | 32 | 256 | 0.5 | — | Nil. | — | — | — | — | 0.83 |
| (2) | 15 | 211 | 12 | 94 | Nil. | — | 176 | — | — | 0.84 |
| (3) | 14 | 212 | 12 | 95 | Nil. | 4.8 | 211 | 4.5 | — | 0.79 |
| (4) | 13 | 210 | 12 | 96 | Nil. | — | — | — | −579 | 0.823 |
| (5) | 13 | 210 | 12 | 96 | Nil. | | | | | |

TABLE 8

| | | | | Time Point III | | | | | |
|---|---|---|---|---|---|---|---|---|---|
| Position | Viscosity CPS | Flash Point °C. | Hardness dmm | Melting Point °C. | Acid No. mg KOH/gm | Pressure kg/cm² | Temperature °C. | Flow Rate m3/hr | Vacuum mmHg | Density g/cc |
| (1) | 32 | 256 | 0.5 | — | Nil. | — | — | — | — | 0.83 |
| (2) | 12 | 211 | 12 | 94 | Nil. | — | 163 | — | — | 0.82 |
| (3) | 13 | 212 | 12 | 95 | Nil. | 4.8 | 211 | 4.5 | — | 0.79 |
| (4) | 12.5 | 210 | 12 | 96 | Nil. | — | — | — | −580 | 0.813 |
| (5) | 12 | 210 | 12 | 96 | | | | | | 0.80 |

Example 5

Figure 4:
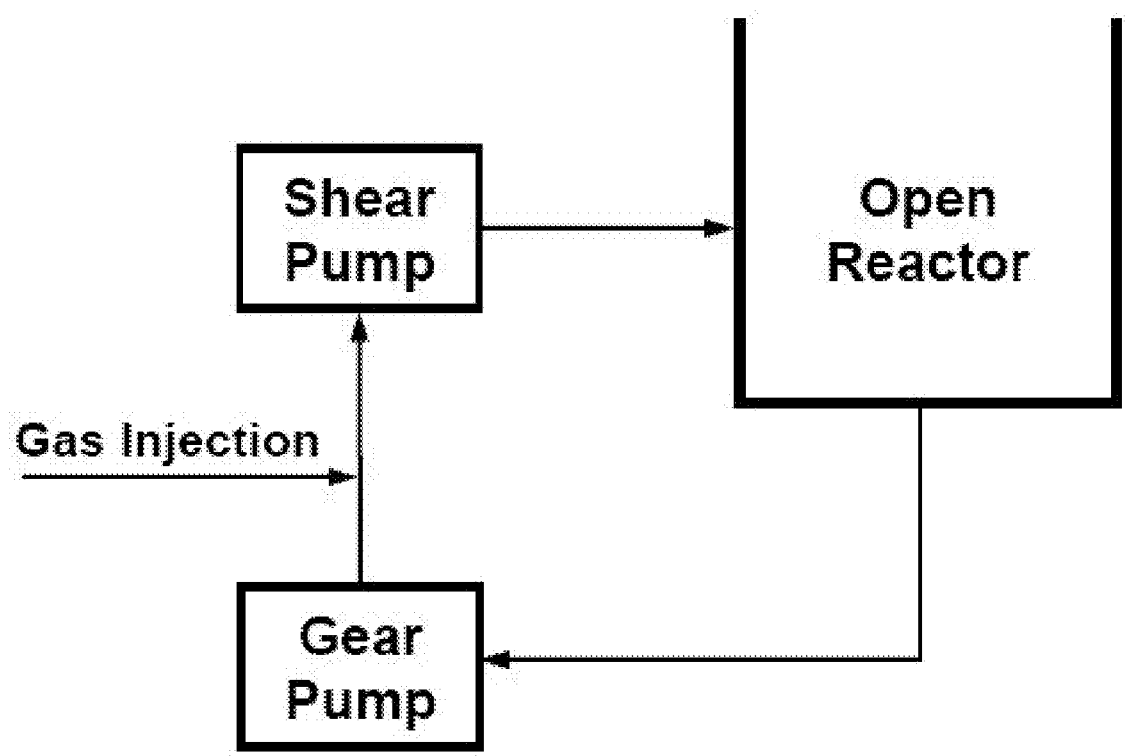
FIG. 4 schematically illustrates another high shear oxidation process for viscosity breaking of polymers, in accordance with an embodiment of the invention.

FIG. 4 represents a high shear oxidation system for viscosity breaking. An open reactor, a gear pump, and a shear pump are fluidly connected to one another, forming a loop. Gas injection is available between gear pump and shear pump. 8 liters of polyethylene wax is heated to 300° F. initially and circulated through the loop. The polyethylene wax in the open reactor is open to and mixed with ambient air. Viscosities are measured at 300° F.

For Run 1, nitrogen is injected via the gas injection line from 0-85 minutes. For Run 2, no nitrogen is injected into the system. For Run 3, oxygen is injected via the gas injection line 15 minutes prior to the measurement of viscosity at time 0 and from 0-30 minutes. Comparing the results of Run 1 and Run 2 and without wishing to be limited by a theory, polyethylene wax viscosity is reduced at a faster rate in the absence of nitrogen, i.e., air as the oxidant in Run 2 causes faster reduction of viscosity, which is an indication of faster polymer oxidation undisturbed by nitrogen injection that leads to cleavage of long polymer chains and formation of lower molecular weight polymers. Comparing the results of Run 2 and Run 3 and without wishing to be limited by a theory, polyethylene wax viscosity reduction is enhanced by the presence of oxygen. 60 minutes of total operation time in Run 3 renders the same degree of viscosity reduction in Run 2 of 195 minutes, i.e., 65.5% of viscosity reduction. This is an illustration of the effect of the oxidant type in high shear oxidation.

| Time (min) | Viscosity (cps) |
|---|---|
| Run 1 | |
| 0 | 275 |
| 15 | 210 |
| 35 | 200 |
| 55 | 195 |
| 70 | 195 |
| 85 | 185 |
| 100 | 185 |
| 115 | 185 |
| 130 | 185 |
| 145 | 185 |
| 160 | 180 |
| 175 | 170 |
| Run 2 | |
| 0 | 275 |
| 15 | 225 |
| 30 | 165 |
| 45 | 150 |
| 60 | 150 |
| 75 | 135 |
| 90 | 135 |
| 105 | 125 |
| 120 | 125 |
| 135 | 120 |
| 150 | 120 |
| 165 | 105 |
| 180 | 105 |
| 195 | 95 |
| Run 3 | |
| 0 | 58.0 |
| 30 | 23.0 |
| 60 | 20.0 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations. of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The inclusion or discussion of a reference is not an admission that it is prior art to the present invention, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A system for high shear oxidation, comprising:
a substrate, wherein said substrate is a polymer, wax, oil, or combinations thereof;
a high shear device, wherein said high shear device has at least one rotor and at least one stator; and
a mixing vessel in fluid communication with said high shear device, wherein said mixing vessel is configured to produce a mixture of an oxidant and said substrate and provide the produced mixture to said high shear device.

2. The system of claim 1, wherein said high shear device and said mixing vessel form a loop for fluid communication.

3. The system of claim 1, further comprising a pump to control the flow rate and residence time of fluids passing through said high shear device.

4. The system of claim 1, further comprising a temperature and pressure control unit to regulate the temperature and pressure of said high shear device.

5. The system of claim 1, further comprising at least one sparger to disperse a gas into said mixing vessel.

6. A system for high shear oxidation, comprising:
a high shear device with at least one inlet and at least one outlet, wherein said high shear device comprises at least one rotor and at least one stator;
a substrate pipe with at least one inlet fluidly connected to a substrate source, and at least one outlet, wherein the substrate source is a polymer, wax, oil, or combinations thereof;
an oxidant pipe with at least one inlet fluidly connected to an oxidant source, and at least one outlet; and
a steam pipe with at least one inlet fluidly connected to a steam source, and at least one outlet, wherein the at least one outlet of the substrate pipe, the at least one outlet of the oxidant pipe, and the at least one outlet of the steam pipe are fluidly connected to the at least one inlet of the high shear device.

7. The system of claim 6, further comprising a flash system fluidly connected to the outlet of the shear device.

8. The system of claim 6, further comprising at least one heat exchanger to control the temperature of the substrate.

9. The system of claim 6, further comprising a gas injection system to control the flow rate of the oxidant in the oxidant pipe.

10. The system of claim 6, further comprising a steam injection system to control the flow rate of steam in the steam pipe.

11. The system of claim 6, further comprising at least one storage vessel fluidly connected to the outlet of the shear device.

12. A method for high shear oxidation, comprising:
obtaining a high shear device having at least one rotor and at least on stator;
mixing an oxidant with a substrate to form a substrate-oxidant mixture, wherein said substrate is a polymer, wax, oil, or combinations thereof; and
applying high shear to said substrate-oxidant mixture in said high shear device to form a product.

13. The method of claim 12, further comprising mixing said substrate and said oxidant in a liquid medium, wherein said liquid medium is organic or inorganic.

14. The method of claim 12, wherein said oxidant is selected from the group consisting of air, oxygen, ozone, peroxide, organic peroxide, halogen, oxygen-containing gas, halogen-containing gas, and combinations thereof.

15. The method of claim 12, wherein mixing an oxidant with a substrate comprises dispersing said oxidant into said substrate or a liquid medium.

16. The method of claim 12, further comprising controlling the substrate-to-oxidant ratio.

17. The method of claim 12, wherein said substrate comprises high viscosity crude oil, polyethylene, or polyethylene wax.

18. The method of claim 12, wherein said product is selected from the group consisting of ethylene oxide, propylene oxide, terephthalic acid, phenol, acrylonitrile, maleic anhydride, phthalic anhydride, nitric acid, caprolactam, oxidized polyethylene, oxidized polypropylene, oxidized polyethylene copolymers, and oxidized polypropylene copolymers, and combinations thereof.

19. The method of claim 12, further comprising mixing steam with said oxidant and said substrate.

20. The method of claim 19, wherein mixing steam with said oxidant and said substrate takes place in said high shear device.

* * * * *